Patented Oct. 21, 1930

1,779,314

UNITED STATES PATENT OFFICE

RICHARD HERZ AND FRITZ SCHULTE, OF FRANKFORT-ON-THE-MAIN, GERMANY, ASSIGNORS TO GENERAL ANILINE WORKS, INC., OF NEW YORK, N. Y., A CORPORATION OF DELAWARE

ALKOXYDERIVATIVES OF 1-AMINONAPHTHALENE-8-CARBOXYLIC-ACID ANHYDRIDE AND PROCESS OF MAKING SAME

No Drawing. Original application filed November 29, 1926, Serial No. 151,596, and in Germany December 4, 1925. Divided and this application filed November 17, 1927. Serial No. 234,036.

This application is a division of our application Serial No. 151,596, filed November 29, 1926, which has matured into Patent No. 1,728,995, dated Sept. 24, 1929.

In the parent application hydroxy derivatives of the 1-aminonaphthalene-8-carboxylic acid-anhydride (naphthostyril) are described.

Our present divisional application relates to new alkoxy derivatives of 1-aminonaphthalene-8-carboxylic-acid-anhydride corresponding probably to the general formula:

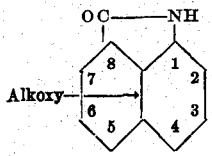

They are obtained by alkylating the aforesaid hydroxyderivatives of the 1-aminonaphthalene-8-carboxylic acid-anhydride by means of alkylating agents. The formed alkoxynaphthostyrils can be converted into the corresponding alkoxy derivatives of the 1-aminonaphthalene - 8 - carboxylic acid by treatment with alkaline saponifying agents.

In order to further illustrate our invention the following example is given, the parts being by weight and all temperatures in centigrade degrees, but it is understood that our invention is not limited to the particular products or reaction conditions mentioned therein:

Example 1 part of the sodium salt of 5-hydroxynaphthostyril (cf. Example 4 of the parent application) is mixed with 4 parts of the methylic-ester of paratoluene-solfonic-acid, 4 parts of sodium-carbonate and about 80 parts of trichlorobenzene and the mixture is heated to about 160–170°, until a sample no longer combines with a diazo compound. Then the trichlorobenzene is driven off by steam and the residue is filtered, washed and dried. The 5-methoxynaphthostyril thus obtained having probably the formula:

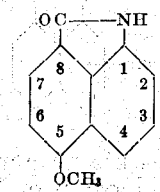

melts, when crystallized from benzene, at 223°. By boiling it with a caustic soda solution of about 10% it is saponified to the corresponding 5-methoxy-1-aminonaphthalene-8-carboxylic acid of the probable formula:

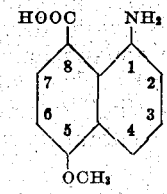

The free acid, obtainable by gently acidifying and cooling the above solution, is when dry, a colorless powder, easily soluble in alkalies, it is diazotizable and capable of combining with diazocompounds. Its difficultly soluble diazocompound crystallizes in yellow crystals and yields azodyestuffs, when combined with hydroxy- or aminocompounds.

By warming the 5-methoxy-1-aminonaphthalene-8-carboxylic-acid with acids the 5-methoxynaphthostyril is re-obtained. In a similar way by ethylating the 5-hydroxynaphthostyril in the usual manner for instance with ethylbromide the corresponding 5-ethoxynaphthostyril is obtained, melting at about 200° and showing the same characteristic properties as the methylderivative.

By treating 6-hydroxynaphthostyril (cf. Example 2 of the parent application) with suitable alkylating agents it is alkylated in the hydroxy-group and the thus formed 6-alkoxy-naphthostyrils can be saponified to the corresponding 6-alkoxy-1-aminonaphthalene-8-carboxylic acids. In the same manner 3-hydroxynapthostyril can be converted into 3-alkoxynaphthostyrils.

We claim:

1. A process for manufacturing alkoxy derivatives of 1-aminonaphthalene-8-carboxylic-acid-anhydride corresponding probably to the general formula:

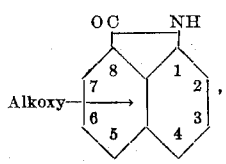

which process comprises treating hydroxy derivatives of 1-aminonaphthalene-8-carboxylic-acid-anhydride with an alkylating agent.

2. As new products the compounds of the general formula:

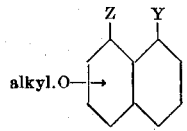

wherein Y represents an amino group and Z a carboxylic acid group, or Y and Z jointly represent the group CO—NH, being in the form of the anhydride crystalline powders neither diazotizable nor capable of combining with diazo compounds, being converted by treatment with alkaline saponifying agents into the corresponding alkoxy derivatives of 1-aminonaphthalene-8-carboxylic acid which are, when dry, colorless powders easily soluble in alkalies, being diazotizable and capable of combining with diazo compounds.

3. As new products the compounds of the general formula:

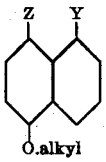

wherein Y represents an amino group and Z a carboxylic acid group, or Y and Z jointly represent the group CO—NH, being in the form of the anhydride crystalline powders neither diazotizable nor capable of combining with diazo compounds, being converted by treatment with alakline saponifying agents into the corresponding alkoxy derivatives of 1-aminonaphthalene-8-carboxylic acid which are, when dry, colorless powders easily soluble in alkalies, being diazotizable and capable of combining with diazo compounds.

4. As a new product the compound of the general formula:

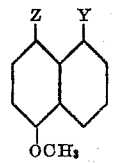

wherein Y represents an amino group and Z a carboxylic acid group, or Y and Z jointly represent the group CO—NH, being in the form of the anhydride a crystalline powder neither diazotizable nor capable of combining with diazo compounds, being converted by treatment with alkaline saponifying agents into the corresponding methoxy derivative of 1-aminonaphthalene-8-carboxylic acid which is, when dry, a colorless powder easily soluble in alkalies, being diazotizable and capable of combining with diazo compounds.

In testimony whereof, we affix our signatures.

RICHARD HERZ.
FRITZ SCHULTE.